United States Patent [19]

Meyer

[11] 4,344,449
[45] Aug. 17, 1982

[54] FAST-ACTING VALVE AND USES THEREOF

[75] Inventor: James A. Meyer, Espanola, N. Mex.

[73] Assignee: The United States of America as represented by the United States Department of Energy, Washington, D.C.

[21] Appl. No.: 150,393

[22] Filed: May 16, 1980

[51] Int. Cl.³ .................. F16K 31/06; F16K 21/06
[52] U.S. Cl. ................................. 137/1; 251/129; 251/282; 239/585
[58] Field of Search ............... 251/282, 336, 129; 239/533.8, 583, 584, 585; 137/1

[56] References Cited

U.S. PATENT DOCUMENTS

| | | |
|---|---|---|
| 2,431,437 | 11/1947 | Van Der Werff . |
| 2,436,992 | 3/1948 | Ernst . |
| 2,702,049 | 2/1955 | Seeloff . |
| 2,791,238 | 5/1957 | Bryant . |
| 2,851,055 | 9/1958 | MacGlashan, Jr. et al. . |
| 2,868,494 | 1/1959 | Kearns et al. . |
| 3,144,047 | 8/1964 | Tjaden . |
| 3,244,192 | 4/1966 | Noland . |
| 3,358,964 | 12/1967 | Cohen et al. ............... 251/282 X |
| 3,368,791 | 2/1968 | Wells . |
| 3,450,353 | 6/1969 | Eckert ........................... 239/585 |
| 3,949,964 | 4/1976 | Freeman . |
| 4,081,141 | 3/1978 | Courson et al. . |

OTHER PUBLICATIONS

"High Speed Electrodynamic High Pressure Gas Ejector", Pribory i Tekhnika Eksperimenta, No. 3, pp. 219-222, May-Jun., 1972 by G. N. Aretov et al.

*Primary Examiner*—Arnold Rosenthal
*Attorney, Agent, or Firm*—Elizabeth O. Slade; Paul D. Gaetjens; Richard G. Besha

[57] ABSTRACT

A very fast acting valve capable of producing a very well-defined plug of gas suitable for filling a theta pinch vacuum vessel is given. The valve requires no springs, instead being stopped mainly by a nonlinear force. Thus, the valve is not subject to bouncing; and the ratio of the size of the valve housing to the size of the valve stem is smaller than it would be if springs were needed to stop the valve stem. Furthermore, the valve can be used for thousands of valve firings with no apparent valve damage.

15 Claims, 3 Drawing Figures

"FAST-ACTING VALVE AND USES THEREOF

The invention is a result of a contract with the Department of Energy (Contract No. W-7405-ENG-36).

BACKGROUND OF THE INVENTION

The present invention relates generally to valves and to methods of producing puffs of gas and relates more particularly to a valve which can both open and close very quickly and to a method of producing very well-defined puffs of gas.

In work in nuclear fusion, a great need has arisen for a fast-acting valve which can both open and close very quickly so as to produce a very sharply defined (i.e., short) puff of gas. Such a puff of gas is desirable for filling a theta pinch, wherein a controlled nuclear fusion reaction takes place, plasma in a long torus or skinny tube being confined by a magnetic field and shock-heated and compressed to produce the high temperatures at which fusion takes place. If a substantial tail is present on the gas puff used to fill a theta pinch, the plasma will cool and its lifetime will be limited. Therefore, a fast opening and fast closing valve is of great, if not critical, importance to a sustained, controlled fusion reaction.

A valve described as fast-opening was disclosed in the article by G. N. Aretov et al., "High-Speed Electrodynamic High-Pressure Gas Injector," Pribory i Tekhnika Eksperimenta, No. 3, pp. 219–222, May-June, 1972. However, upon close examination of that reference, it appears clear that the description in the reference does not lead one to the fast-opening and fast-closing valve of this invention which possesses two special features, both of which contribute to a fast closing. In fact, that article appears from the drawing even to teach away from at least one of these two features. Additionally, the valve in that article includes a spring; and the operation of that valve appears to be different from that of the present invention.

Valves which require springs to slow down and close the valves generally require frequent maintenance of the springs; and the valve housing must be quite large in order to house the spring when the valve is to move at very high speeds. For example, if a valve stem having a mass of 50 grams, a stem speed of 30 meters per second, and a maximum distance of stem travel of 4 millimeters must be stopped without damage to the valve solely by use of a spring, the spring would be required to have a spring constant of about 8 tons per inch. Considering that the coil springs of an automobile have spring constants of about one ton per inch, one can readily see that if a spring alone must stop the above-described valve stem, the spring would have to be very large and would require a very large housing in comparison with the size of the valve stem. Furthermore, when a spring is used in a valve to stop a valve stem, the valve stem is subject to bouncing; and this is highly undesirable when a well-defined puff of gas is sought. Furthermore, a linear spring would act to decrease the speed of the valve stem continuously as the spring is compressed, thus lengthening the opening time; and a short puff of gas could not be produced.

SUMMARY OF THE INVENTION

An object of this invention is a valve which is both fast opening and fast closing.

Another object of this invention is a valve suitable for producing a very well-defined puff of gas, useful for example in a theta pinch.

Yet another object of this invention is a fast-acting valve having a long lifetime (i.e., at least several thousands of shots).

A further object is to provide a method of producing a very well-defined puff of gas.

Additional objects, advantages, and novel features of the invention will be set forth in part in the description which follows and in part will become apparent to those skilled in the art upon examination of the following or may be learned by practice of the invention. The objects and advantages of the invention may be utilized and attained by means of the instrumentalities and combinations particularly pointed out in the appended claims.

To achieve the foregoing and other objects and in accordance with the purposes of the present invention, as embodied and broadly described herein, the valve of this invention comprises:

(a) a valve housing;
(b) a valve stem having a coil end and a muzzle end and being able to reciprocate within the valve housing so that the valve has a fully open position, a plurality of partially open positions and a fully closed position, the size and shape of the valve stem relative to the valve housing being such that at least one air cushion space is formed between the valve stem and the valve housing;
(c) sealing means for sealing the at least one air cushion space; and
(d) a gas reservoir which is in open communication with a space external to the valve when the valve is in an open position and which is sealed off from that external space when the valve is in its fully closed position, the valve stem having a shape such that when the valve is in an open position, gas is released from the gas reservoir to the external space so as to exert a force on the valve stem tending to restore the valve to its fully closed position.

Also according to the invention, the above-described valve is operated in cooperation with an actuating means located adjacent to the coil end of the above-described apparatus.

In a preferred embodiment, the actuating means is a specially produced pancake coil which can be operated with high voltage.

In a further aspect of the present invention, in accordance with its objects and purposes, a method of producing a very well-defined puff of gas comprises:

(a) opening a valve containing a first pressurized gas when the valve stem is moving at its maximum velocity, thus allowing the first pressurized gas to flow out of the valve when the valve is in an open position; and
(b) slowing down the valve stem nonlinearly and closing the valve by (1) having the valve stem compress a second gas located within at least one sealed air cushion chamber located within the valve housing and (2) having the first pressurized gas exert a restoring force on the valve as it flows out of the valve.

The apparatus according to the invention exhibits the advantages of having the capability of a very fast opening time (on the order of 100 microseconds), a very fast closing time (also on the order of 100 microseconds), and a quite long lifetime (at least several thousands of valve firings). Additionally, because no spring need be used to slow or stop the valve stem, the size of the valve housing relative to the size of the valve stem need not be nearly so large as would be required if springs were needed to stop the valve stem; and the valve is not subject to bouncing. This particular combination of advantages is believed not to have existed in any valve known in the prior art.

Because the valve is both fast opening and fast closing and is not subject to bouncing, it can be used to produce a well-defined puff of gas suitable for use, for example, in filling a theta pinch vacuum vessel.

BRIEF DESCRIPTION OF THE DRAWINGS

The accompanying drawings, which are incorporated in and form a part of the specification, illustrate preferred embodiments of the present invention and, together with the description, serve to explain the principles of the invention.

DESCRIPTION OF THE PREFERRED EMBODIMENTS

Figure 1:
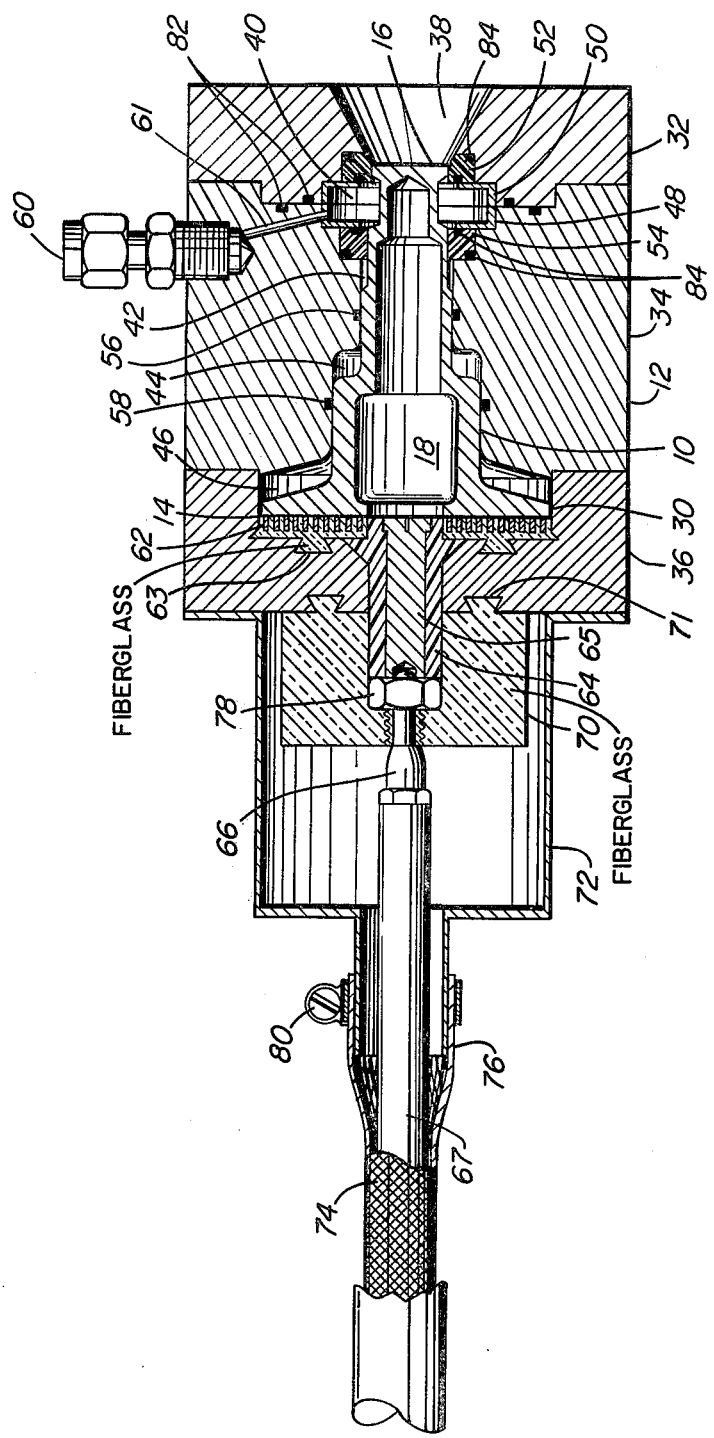
FIGS. 1 and 2 are schematic illustrations in cross section of a preferred embodiment of the valve (i.e., the valve stem within the valve housing) in its open and closed positions, respectively, the valve stem being axially symmetric.
Figure 2:
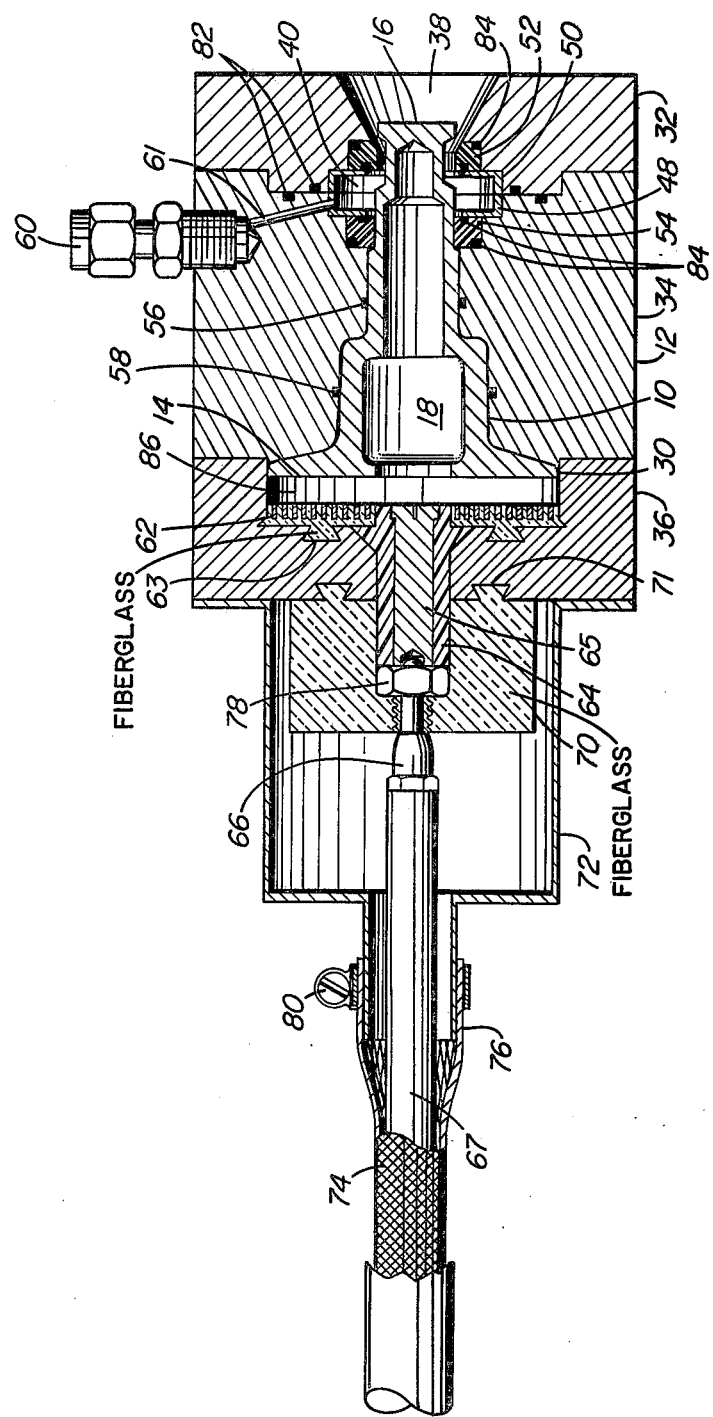
Figure 3:
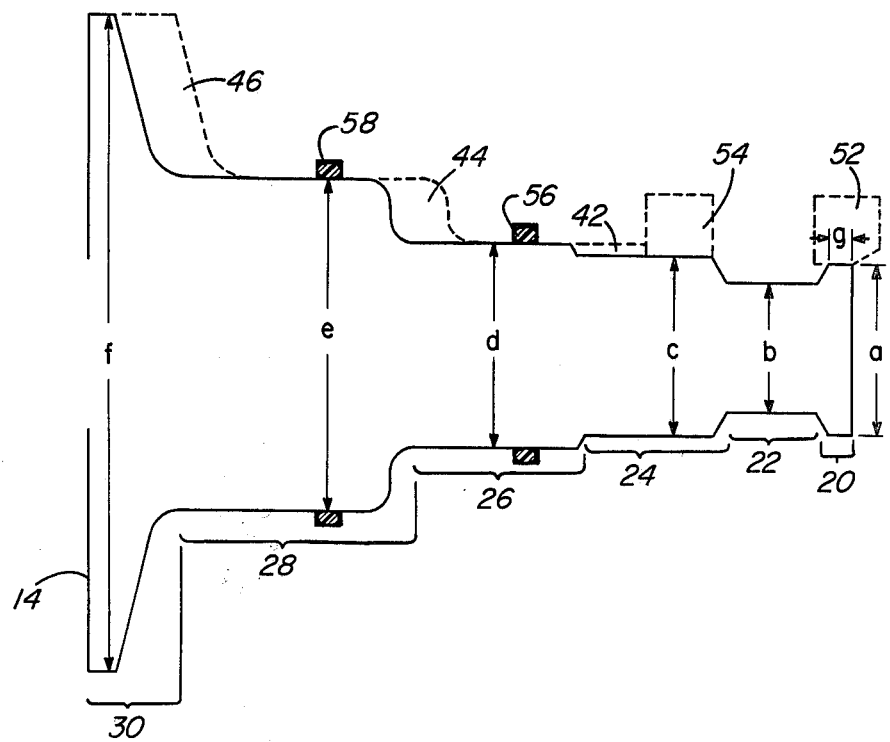
FIG. 3 is a schematic illustration in cross-section of the embodiment of the valve stem shown in FIGS. 1 and 2 and having 6 portions.

Referring to the drawing, in FIGS. 1, 2, and 3, for each labeled part of the valve stem 10, there is a corresponding part which is shown but which is not labeled in each cross-sectional view.

In FIG. 1, showing a preferred embodiment of the valve in its closed position, a valve stem referred to generally as 10 is shown located within valve housing 12. Valve stem 10 has a coil end 14 and a muzzle end 16 and is made of metal. The center of valve stem 10 is preferably bored out from coil end 14 almost through to muzzle end 16, so as to leave a hollow space 18, thereby reducing the mass of the valve and permitting faster speeds. Valve stem 10 as shown in FIG. 1 and as more clearly shown and labeled in FIG. 3 preferably has six segments, each segment of which has a particular largest diameter, as described below. The six portions of valve stem 10 are first portion 20, second portion 22, third portion 24, fourth portion 26, fifth portion 28, and sixth portion 30, all of which are continuously connected together and machined from one piece of metal.

Valve housing 12 has three portions, first portion 32, second portion 34, and third portion 36, formed preferably from three pieces of metal which are shaped and bolted together so as to form one structure. Valve housing 12 has a hollow portion therein (not shown), within which valve stem 10 reciprocates. The shape of the hollow portion in valve housing 12 is substantially the same as the shape of valve stem 10, except that valve stem 10 is slightly smaller than the hollow portion, there are spaces in the hollow portion into which valve stem 10 can move as it reciprocates, and the hollow portion is in open communication with a space external to the valve (for example, a vacuum vessel) at muzzle 38 when the valve is open. There are five spaces (shown as blanks in FIG. 1) corresponding to one less than the number of portions of valve stem 10. As the valve opens, muzzle end 16 of valve stem 10 moves into muzzle 38; third portion 24 moves into gas reservoir 40; fourth portion 26 moves into third space 42; fifth portion 28 moves into sealed air chamber 44; and sixth portion 30 moves into fifth space 46.

Located around the circumference of gas reservoir 40 and between front seal 52 and rear seal 54 are seal retainers 48 and 50. These retainers hold front seal 52 and rear seal 54 in their respective positions and they form the walls of gas reservoir 40.

Sealed air chamber 44 is sealed on either side by first seal 56 and second seal 58, which are preferably o-rings, each of which is located within a small groove cut into valve housing 12. These grooves serve to prevent first seal 56 and second seal 58 from being displaced to an appreciable extent as the valve stem 10 reciprocates.

Gas inlet 60 is preferably continuously in open communication with a pressurized gas source (not shown) which feeds pressurized gas into gas reservoir 40 through conduit 61.

Preferred actuating means pancake coil 62 is held in a fixed position by means of dovetail grooves 63 within third portion 36 of valve housing 12. Third portion 36 of valve housing 12 houses a cylinder 64 made of an insulator which is preferably machined fiberglass. Cylinder 64 houses solid metal rod 65; having a bore in one end, into which a high voltage connection is connected by means of a plug such as a banana plug 66. Cylinder 64 is slotted (not shown) at the end near valve stem 10. One end of the flattened wire forming the turns of the pancake coil is soldered into a slit in solid metal rod 65, and the wire is next passed through the slot in cylinder 64. The other end of the coil is fastened by means of set screws to third portion 36 (made of metal), thus completing the circuit. Cylinder 64 extends beyond the usual boundary of third portion 36; and that extending portion is housed within extending housing 70, which is preferably made of molded fiberglass and epoxy. Extending housing 70 is housed within hollow outer housing 72, which is connected to third portion 36 by screws (not shown). Extending housing 70 is connected by means of dovetail grooves 71 to third portion 36.

High voltage connection (not shown) is the inner conducting portion of coaxial cable 74 and is located within insulator 67; the outer conducting portion is terminal 76. Coaxial cable 74 should be grounded. Solid metal rod 65 is threaded to take nut 78. Solid metal rod 65 continues through cylinder 64 and it (as well as the slotted end of cylinder 64) is covered by fiberglass (not shown), over which a removable thin sheet of insulator such as Mylar ® (not shown) is fitted so as to cover all of the turns of the coil, solid metal rod 65, and cylinder 64 when the valve is assembled. A nut 78 is positioned on the end of solid metal rod 65 near terminal 76. When nut 78 is tightened, cylinder 64 is maintained in its position. Clamp 80 is used to clamp terminal 76 onto hollow outer housing 72. Coaxial cable 74 is connected to any source of changing current suitable for actuating the valve stem 10.

Seals 82 are positioned along the boundary between second portion 34 and first portion 32 of valve housing 12. Seals 84 are positioned around front seal 52 and rear seal 54.

In FIG. 2, showing the valve in its open position, the parts are the same as and are numbered the same as those described for FIG. 1. The spaces which were described for FIG. 1, however, are all closed at least partially in FIG. 2 by the respective parts of valve stem 10 which have moved into those spaces. Instead of the spaces shown in FIG. 1, a space 86 exists in FIG. 2 between coil end 14 of valve stem 10 and pancake coil 62. Gas from gas inlet 60 flows out from gas reservoir 40, around muzzle end 16 of valve stem 10, into muzzle 38, and finally out of valve housing 12.

In FIG. 3, a cross section of valve stem 10 is schematically shown, without showing hollow space 18. The six portions of valve stem 10, further described below, are labeled in FIG. 3. For strength, these portions are tapered as shown. This tapering is particularly important for sixth portion 30. Shown in dotted lines (for purposes of orientation) are fifth space 46, sealed air chamber 44, third space 42, rear seal 54, and front seal 52. The largest diameter of first portion 20 of valve stem 10 is a; of second portion 22, b; of third portion 24, c; of fourth portion 26, d; of fifth portion 28, e; and of sixth portion 30, f.

The operation of the valve is the following. Initially the valve is in its closed position, as shown in FIG. 1; and no current flows in pancake coil 62. The pressurized gas located within gas reservoir 40 exerts an axial force on front seal 52 when the valve is closed. In turn, front seal 52 exerts a radial force on muzzle end 16 of valve body 10 so as to prevent escape of gas from the valve when the valve is in its closed position. Next, a pulse of current is sent through pancake coil 62, the pulse being preferably a half sine wave pulse so that there is no residual current to retard the return speed; and the changing magnetic field sets up an induced current in coil end 14 of valve stem 10. The induced current interacts with the magnetic field, and valve stem 10 is forced away from pancake coil 62; and the valve begins to open. Pressurized gas located in gas reservoir 40 then flows out through the space which has opened between muzzle end 16 and front seal 52. The valve begins to open at the same time that valve stem 10 is moving at its maximum velocity. This is achieved by the choice of the dimensions of stem 10 and seal 52 for a particular force applied to valve stem 10 by coil 62. It has been found that the impulse applied to the coil end of the stem causes axial compression of the stem and the stem actually is deformed at space 46. When the muzzle end of the stem reaches its maximum velocity, it has moved a distance g (shown in FIG. 3).

After valve stem 10 has reached its maximum velocity, it moves at nearly its maximum velocity for a short time and then begins to slow down because of two features in the valve. The air (now compressed) within sealed air chamber 44 operates to slow down the valve stem, as does the feature (further described below) that c be greater than a. The action of sealed air chamber 44 performs two related functions; i.e., it provides a highly nonlinear cushioning element which stops the forward motion of the valve stem 10 without damage to the valve body and it provides a restoring force to return the valve stem to its closed position. Thus, at least one sealed air chamber 44 is required. The sealing can be done by seals located so that one seal is on either side of the air chamber between valve stem 10 and valve housing 12.

The operation of sealed air chamber 44 is approximately described by the equation $F = -P_o A[x/(q-x)]^k$, wherein F is the retarding force of the air chamber, wherein $P_o$ is the chamber fill pressure, A is the cross-sectional area of the chamber, q is the maximum stroke length, x is the distance traveled by the valve stem, and k is the ratio of specific heat at constant pressure to that at constant volume of the gas in the chamber. $P_o$ is atmospheric pressure when the air chamber is filled with air at atmospheric pressure, and k is 1.4 (assuming ideal gas laws, which provide a rough approximation). One can readily see that the restoring force of the air chamber is quite small until x is nearly equal to q; and then the restoring force very quickly becomes very large. This feature is extremely important for obtaining a very short puff of gas. This nonlinear restoring force is quite different from the restoring force of a spring, $F = -kx$, which is proportional to the displacement x.

In the apparatus of the invention, to achieve proper seating of the valve in its fully closed position without using a spring, it is required that the valve stem have a shape such that when the valve is in an open (i.e., fully or partially open) position, gas is released from the gas reservoir to a space external to the valve so as to exert a force on the valve stem tending to restore the valve to its fully closed position. This is achieved when a is greater than b and c is greater than a (where a, b, and c are shown in FIG. 3). When c is greater than a, the component of the surface area vector lying parallel to the axis of the valve stem will be larger for third portion 24 than for first portion 20. (This was not required in the Russian reference cited above, and particularly not as shown in FIG. 1 of that paper). Hence the force exerted on third portion 24 due to the gas pressure will be larger than on first portion 20. When c is greater than a and a is greater than b and when the valve is in its open position, gas flowing out of the valve between first portion 32 and the muzzle end 16 of valve stem 10 will exert a restoring force to help close the valve.

Although preferred, it is not required that the valve stem 10 comprises six portions as shown in FIG. 3. There must, however, be enough portions to form at least one air cushion space and to provide the structure on which the restoring force acts at the muzzle end (as described above).

Front seal 52 and rear seal 54 can be formed from any material which exerts a radial force when it is stressed in the axial direction. For example, Teflon Ⓡ can be used.

Any suitable actuating means can be used to actuate the valve. When the actuating means employs a source of electrical current, it is required that the electrical source be such that it gives rise to a changing magnetic field, which induces the current that causes the valve stem to be accelerated and to open the valve. Thus, the coil end 14 of the valve stem must be made of metal. Any current pulse having an amplitude which is approximately zero when the valve is to begin to close can be used, although a half sine wave pulse was used in the example below and is preferred.

In a preferred embodiment, the actuating means is a pancake coil formed from flattened copper wire, using fiberglass as insulation between the turns. The copper wire is preferably glued onto a similarly shaped strip of fiberglass, and one end of wire is soldered to metal rod 65. The wire is tightly wound around the rod, so as to maximize the number of turns in the area occupied by the coil. Fiberglass is next placed on top of and below the formed coil for insulation. Then, the coil is inserted into third portion 36 of valve housing 12; and the loose end of the wire is clamped by a set screw into third portion 36. The formed coil is then impregnated with epoxy.

In order to optimize the speed of the valve stem, its mass should be small. Thus, preferably the valve stem will be hollow and will be made of an alloy of aluminum or of some other strong but lightweight metal. Also, to increase the speed of the valve, one can increase the amplitude of the current through the actuating means for a given pulse time length. And, preferably the cross-sectional area of the coil end will be large as compared with other sections of the valve stem; and the number of turns in the coil area will be maximized.

In order to further increase the speed of closing of the valve, the externally applied gas pressure can be increased; and the quantity c can be increased with respect to the quantity a. In order to increase the restoring force of the air cushion chamber, the fill pressure $P_o$ can be increased and the piston area A can be increased. However, these measures will have a minor influence on the restoring force, as compared with the effect of the factor $(x/q-x)$.

In order to achieve the many advantages set forth above, preferably no spring will be used in the valve.

For convenience, the externally applied gas pressure used for closing the valve is continuously in open communication with the source of that pressurized gas. However, if desired, the pressurized gas could be turned on only during the period of time of closing of the valve.

If desired, more than one sealed air cushion space can be employed in the valve; and, if desired, a plurality of valves can be operated simultaneously to fill a theta pinch vacuum vessel, for example.

EXAMPLE

A valve having the design shown in FIGS. 1, 2, and 3 was constructed. The valve stem and valve housing were made of an aluminum alloy comprising 97.9% aluminum and normal impurities, 0.6% silicon, 0.25% copper, 1.0% magnesium, and 0.25% chromium. The valve was operated in cooperation with a pancake coil, which was made as described above. The valve stem had a mass of 50 grams, a maximum stem travel of 4 millimeters, and a cross-sectional area of the coil end 14 of 20.3 cm$^2$. The pancake coil had 30 turns. The applied current was approximately half sine wave pulses of approximately 70 μsec duration, with a maximum of 5300 amps. The applied pressure used in closing the valve was 1400 psi. The maximum speed of the valve operated under these conditions was measured to be about 18 m/sec, and the valve was used for 3000 shots without any apparent damage. Additionally, it is noted that the volume occupied by the valve housing was only about 2100 cc and the volume occupied by the valve stem was only about 18.5 cc. The ratio of volumes was thus only about 115.

This valve was used to produce puffs of gas which were used to fill a theta pinch vacuum vessel. The opening time (i.e., time from start of current to the time at maximum valve opening) of the valve was 150 μsec, the closing time (i.e., the time from maximum opening to time at cessation of gas flow) was 200 μsec, and the overall time during which any gas flowed out of the valve was less than 250 μsec, (as estimated by the characteristics of the gas puff emitted by the valve).

The foregoing description of preferred embodiments of the invention has been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and their practical application to thereby enable others skilled in the art to best utilize the invention in various embodiments and with various modifications as are suited to the particular uses contemplated. It is intended that the scope of the invention be defined by the claims appended hereto.

What is claimed is:
1. A valve comprising:
   a. a valve housing;
   b. a valve stem having a coil end and a muzzle end and being able to reciprocate within said valve housing so that said valve has a fully open position, a plurality of partially open positions, and a fully closed position, said valve stem having a size and shape relative to said valve housing such that at least one air cushion space is formed between said valve stem and said valve housing;
   c. a sealing means for sealing said at least one air cushion space so as to provide an air-tight fit in order to pressurize air located within said at least one air cushion space, thus providing a first restoring force to help close the valve and thus protecting said valve from destruction; and
   d. a gas reservoir located within said valve housing, said gas reservoir being in open communication with a space exterior to said valve when said valve is in an open position and being sealed off from said space exterior to said valve when said valve is in its fully closed position,
   wherein said valve stem has x consecutively numbered portions, each portion of which has a particular largest diameter and x being an integer greater than 3, wherein said first portion has a surface corresponding to said muzzle end which is exposed to said space exterior to said valve, wherein said xth portion has a surface corresponding to said coil end which is exposed to an actuating means, wherein said first portion has a largest diameter a, wherein said second portion has a largest diameter b, wherein said third portion has a largest diameter c, wherein c is greater than a, and wherein a is greater than b, so that when said valve is in its fully open position or a partially open position, gas is released from said gas reservoir to said space exterior to said valve so as to exert a larger force in the axial direction on said third portion than on said first portion, thus providing a second restoring force tending to restore said valve to its closed position.

2. A valve according to claim 1, wherein said valve has no linear spring for closing said valve.

3. A valve according to claim 2, wherein said valve stem and said valve housing are coaxial and wherein said sealing means comprises a first seal and a second seal positioned between said valve housing and said valve stem, said first seal and said second seal being separated by an air cushion space.

4. A valve according to claim 3, wherein when said valve is in its closed position, said gas reservoir is sealed off from said space exterior to said valve by a seal which exerts a radial force when an axial force is applied to said seal.

5. A valve according to claim 4, wherein said coil end has a largest diameter which is much larger than any other diameter of any other portion of said valve stem.

6. A valve according to claim 5, wherein x is 6.

7. An apparatus comprising a valve according to claim 1 or claim 6 and including also in operable communication therewith an actuating means suitable for actuating said valve.

8. An apparatus according to claim 7, wherein said actuating means comprises a pancake coil which is operable at high voltage.

9. A method of producing a well-defined plug of gas, said method comprising:
   a. opening a valve when its valve stem is moving at its maximum velocity allowing a first pressurized gas to flow out of said valve; and
   b. slowing down said valve stem nonlinearly and closing said valve by (1) compressing a second gas located within at least one sealed air cushion chamber positioned between the housing of said valve and said valve stem and by (2) having said first pressurized gas exert a restoring force on said valve while said first pressurized gas flows out of said valve.

10. A method according to claim 9, wherein said valve is opened by means of an electromagnetic actuating means, wherein said valve stem has a coil end and a muzzle end, and wherein said coil end has a largest diameter which is larger than any other diameter of any other portion of said valve stem.

11. A method according to claim 10, wherein said electromagnetic actuating means is a pancake coil, wherein said valve stem has six consecutively numbered portions, each portion of which has a particular largest diameter, wherein said first portion has a surface corresponding to said muzzle end which is exposed to a space exterior to said valve, wherein said sixth portion has a surface corresponding to said coil end which is exposed to said actuating means, wherein said first portion has a largest diameter a, wherein said second portion has a largest diameter b, wherein said third portion has a largest diameter c, wherein c is greater than a, and wherein a is greater than b.

12. A method according to claim 11, wherein a pulse of current which is a half sine wave is sent through said pancake coil so as to open said valve.

13. A valve according to claim 6, wherein said gas reservoir is located adjacent to said second portion when said valve is in its closed position.

14. A valve according to claim 13, wherein said gas reservoir is connected to a gas supply source by a passageway having a largest cross-sectional area which is much smaller than the cross-sectional area of said gas reservoir.

15. A valve according to claim 13 or 14 wherein said valve is made of an aluminum alloy, wherein the ratio of the volume of the valve housing relative to the volume of the valve stem is about 115, and wherein the opening and closing times of the valve are both less than 250 $\mu$sec.

* * * * *